(12) United States Patent
Senter et al.

(10) Patent No.: US 8,091,270 B2
(45) Date of Patent: Jan. 10, 2012

(54) ILLUMINATED FISHING LURE

(75) Inventors: Robert L. Senter, Castle Rock, CO (US); Robert E. Matuszewski, Castle Rock, CO (US)

(73) Assignee: R2 Innovations, LLC, Castle Rock, CO (US)

( * ) Notice: Subject to any disclaimer, the term of this patent is extended or adjusted under 35 U.S.C. 154(b) by 589 days.

(21) Appl. No.: 11/233,558

(22) Filed: Sep. 22, 2005

(65) Prior Publication Data

US 2007/0062094 A1    Mar. 22, 2007

(51) Int. Cl.
*A01K 85/00* (2006.01)
(52) U.S. Cl. .......................................... 43/17.6; 43/42.33
(58) Field of Classification Search ...... 43/42.02–42.53, 43/17.6
See application file for complete search history.

(56) References Cited

U.S. PATENT DOCUMENTS

| | | | | |
|---|---|---|---|---|
| 3,828,177 A | * | 8/1974 | Day | 43/17.6 |
| 3,940,868 A | * | 3/1976 | Northcutt | 43/17.6 |
| 4,114,305 A | * | 9/1978 | Wohlert et al. | 43/17.6 |
| 4,175,348 A | * | 11/1979 | Ray | 43/17.6 |
| 4,199,888 A | * | 4/1980 | Barnes | 43/42.33 |
| 4,227,331 A | | 10/1980 | Ursrey et al. | |
| 4,250,650 A | | 2/1981 | Fima | |
| 4,347,681 A | | 9/1982 | Fima | |
| 4,426,803 A | * | 1/1984 | Helling | 43/17.6 |
| 4,437,257 A | * | 3/1984 | Kluge | 43/42.45 |
| 4,581,839 A | | 4/1986 | Mattison | |
| 4,669,213 A | | 6/1987 | LeRoy | |
| 4,693,032 A | | 9/1987 | Mattison | |
| 4,700,504 A | | 10/1987 | Mattison | |
| 4,751,788 A | | 6/1988 | Mattison | |
| 4,800,670 A | | 1/1989 | Mattison | |
| 4,811,513 A | * | 3/1989 | Grobl | 43/17.6 |
| 4,888,905 A | | 12/1989 | Garr | |
| 4,959,919 A | | 10/1990 | Rao et al. | |
| 5,005,311 A | | 4/1991 | Dawson et al. | |
| 5,175,951 A | | 1/1993 | Fruchey | |
| 5,245,782 A | * | 9/1993 | Pahle | 43/42.32 |
| 5,299,107 A | | 3/1994 | Ratcliffe et al. | |
| 5,392,555 A | | 2/1995 | Tingey | |
| 5,461,815 A | | 10/1995 | Rodgers | |
| 5,758,450 A | | 6/1998 | Young | |
| 5,879,076 A | | 3/1999 | Cross | |

(Continued)

OTHER PUBLICATIONS

"Cabela's Saltwater", Cabela's Inc., catalog, pp. 1-132, 2005.

(Continued)

*Primary Examiner* — Kimberly Smith
(74) *Attorney, Agent, or Firm* — Setter Roche LLP

(57) ABSTRACT

The present invention relates to fishing lures equipped with one or more light sources interacting and/or interfacing with one or more light transmission mediums. The light transmission medium acts to illuminate one or more areas proximate to the fishing lure to provide a natural luminance or iridescence. The light transmission medium can be made from a flexible translucent hot melt thermoplastic material extruded into a polymer lens and can be located on an outer surface of a body of the fishing lure or inside the body of the fishing lure. The light transmission medium can also be provided in the form of a soft flexible component made from Plastisol or other similar translucent materials. The light source can be embedded in or located proximate to the light transmission medium to amplify, intensify, and/or disperse light along the light transmission medium to provide a natural looking luminescence to the fishing lure.

29 Claims, 11 Drawing Sheets

U.S. PATENT DOCUMENTS

| | | | |
|---|---|---|---|
| 6,055,763 A | | 5/2000 | Trotter |
| 6,146,006 A | | 11/2000 | Cross |
| 6,182,391 B1 | | 2/2001 | Hubbard |
| 6,318,016 B1 | * | 11/2001 | Ellig ............................ 43/17.6 |
| 6,796,077 B1 | * | 9/2004 | Dupree et al. ................. 43/17.6 |
| 6,807,766 B1 | | 10/2004 | Hughes et al. |
| 6,922,935 B2 | | 8/2005 | Yu |
| 7,013,490 B2 | | 3/2006 | Senter et al. |
| 7,107,717 B2 | * | 9/2006 | Pelegrin ......................... 43/17.6 |
| 2004/0200125 A1 | * | 10/2004 | Albanito et al. ............. 43/42.36 |
| 2004/0213007 A1 | * | 10/2004 | Portillo ........................ 362/487 |
| 2004/0244265 A1 | | 12/2004 | Miyata et al. |
| 2005/0011105 A1 | * | 1/2005 | Cameron et al. ................. 43/17 |

OTHER PUBLICATIONS

"Yo-Zuri 'The Future of Fishing Tackle' Amazing Minnows Series Lures", Yo-Zuri, Inc., located at http://www.yo-zuri.com/store.html, 2 pages, retrieved May 3, 2004.

"Yo-Zuri 'The Future of Fishing Tackle' Mag Minnows Series Lures", Yo-Zuri, Inc., located at http://www.yo-zuri.com/store.html?wc=4, 1 page, retrieved May 3, 2004.

"Yo-Zuri 'The Future of Fishing Tackle' Bass Arms Series Lures", Yo-Zuri, Inc., located at http://www.yo-zuri.com/store.html?wc=3, 1 page, retrieved May 3, 2004.

"Yo-Zuri 'The Future of Fishing Tackle' 3D and Micro Series Lures", Yo-Zuri, Inc., located at http://www.yo-zuri.com/store.html?wc=5, 1 page, retrieved May 3, 2004.

"Yo-Zuri 'The Future of Fishing Tackle' Blue Water Series Lures", Yo-Zuri, Inc., located at http://www.yo-zuri.com/store.html?wc=6, 1 page, retrieved May 3, 2004.

"Yo-Zuri 'The Future of Fishing Tackle' New For 2003!", Yo-Zuri, Inc., located at http://www.yo-zuri.com/store.html?wc=9, 1 page, retrieved May 3, 2004.

"Yo-Zuri 'The Future of Fishing Tackle' Octopus Skirts", Yo-Zuri, Inc., located at http://www.yo-zuri.com/octopusskirts.html, 1 page, retrieved May 3, 2004.

"Fishing Lures That Glow in the Day (and Dark), located at http://www.photonlures.com/?source=overture?keyword=fishing_lure_manufacturer&OVRAW=Fishing%..." 2 pages, retrieved May 3, 2004.

"Fishing Tackle", FishHoo!, located at http://www.fishhoo.com/Fishing_Tackle/index.html, 1 page, retrieved May 3, 2004.

* cited by examiner

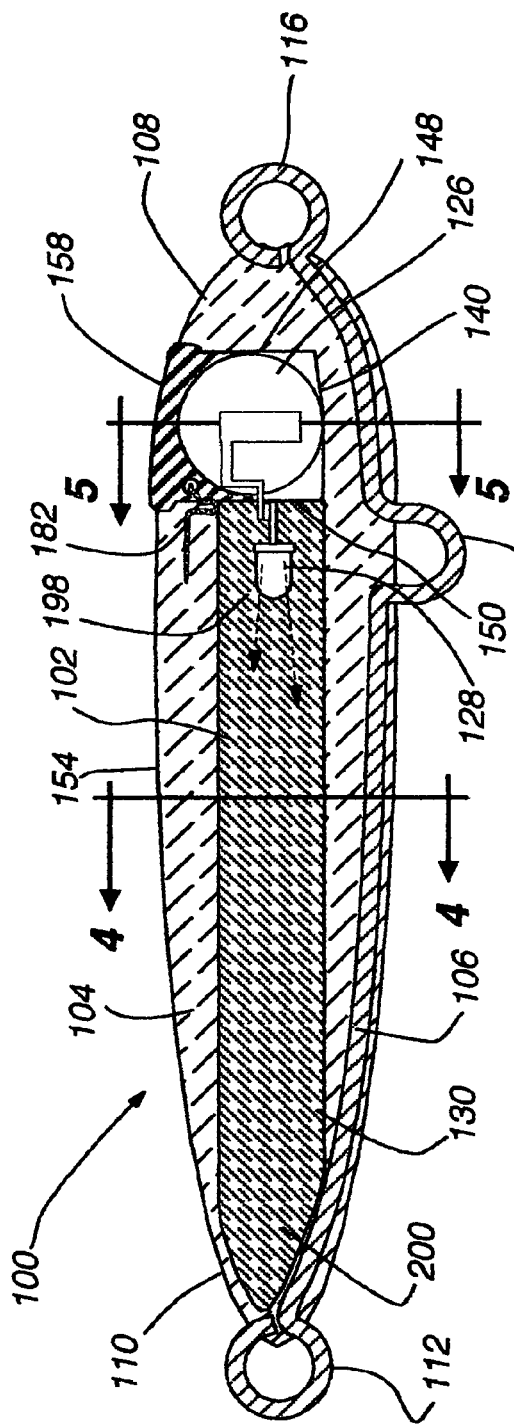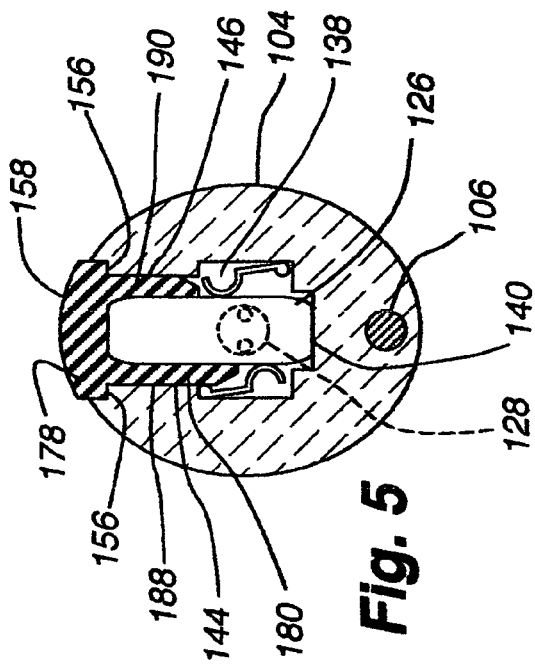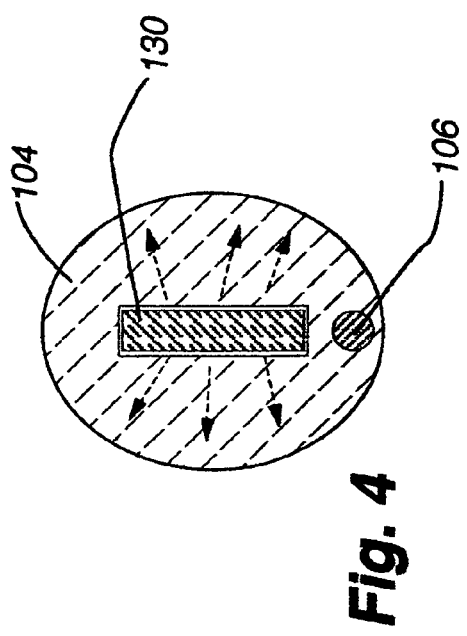

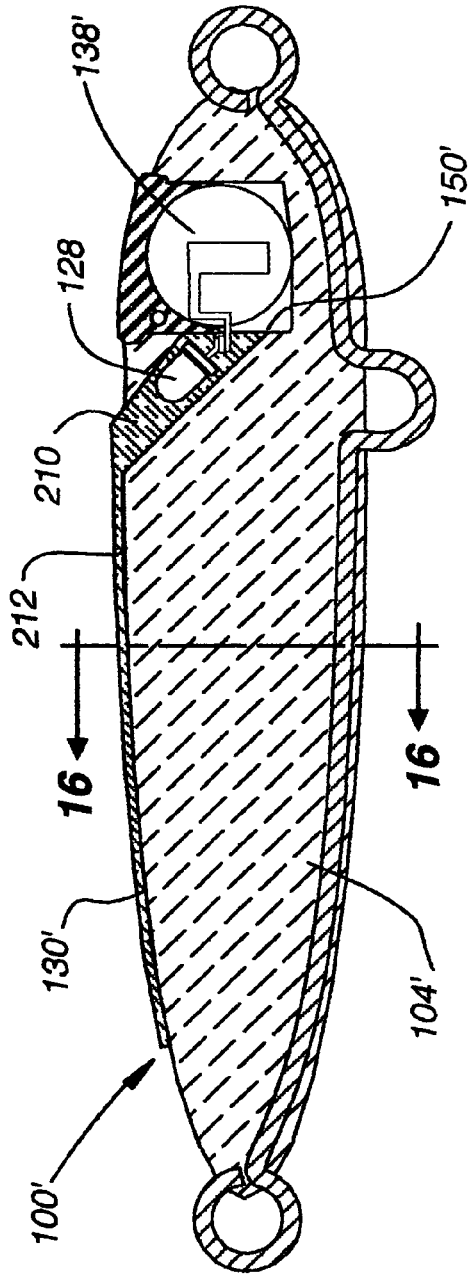
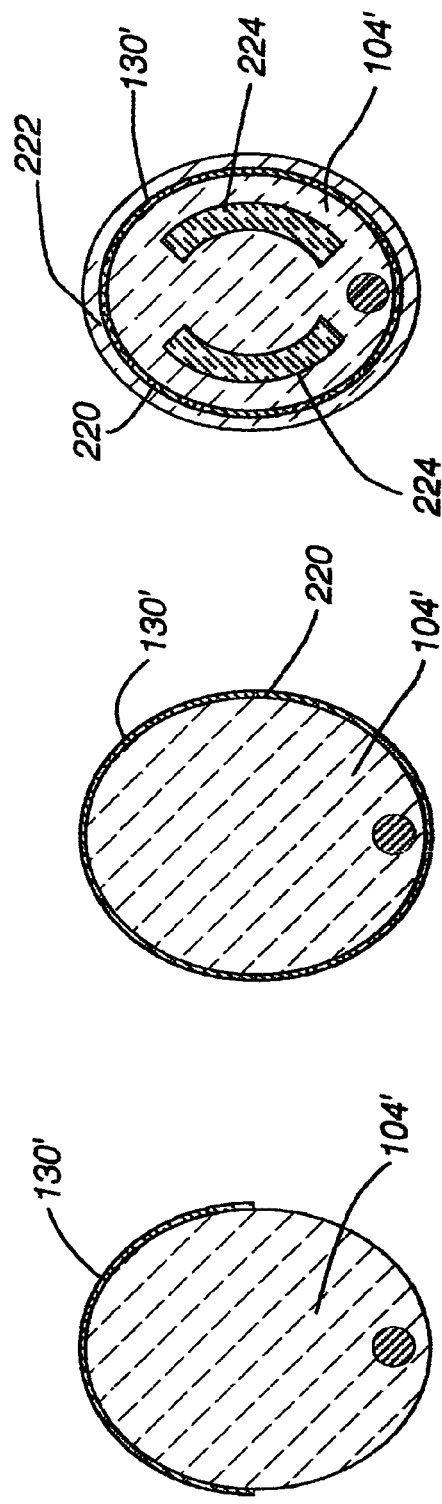
Fig. 15
Fig. 16
Fig. 16A
Fig. 16B

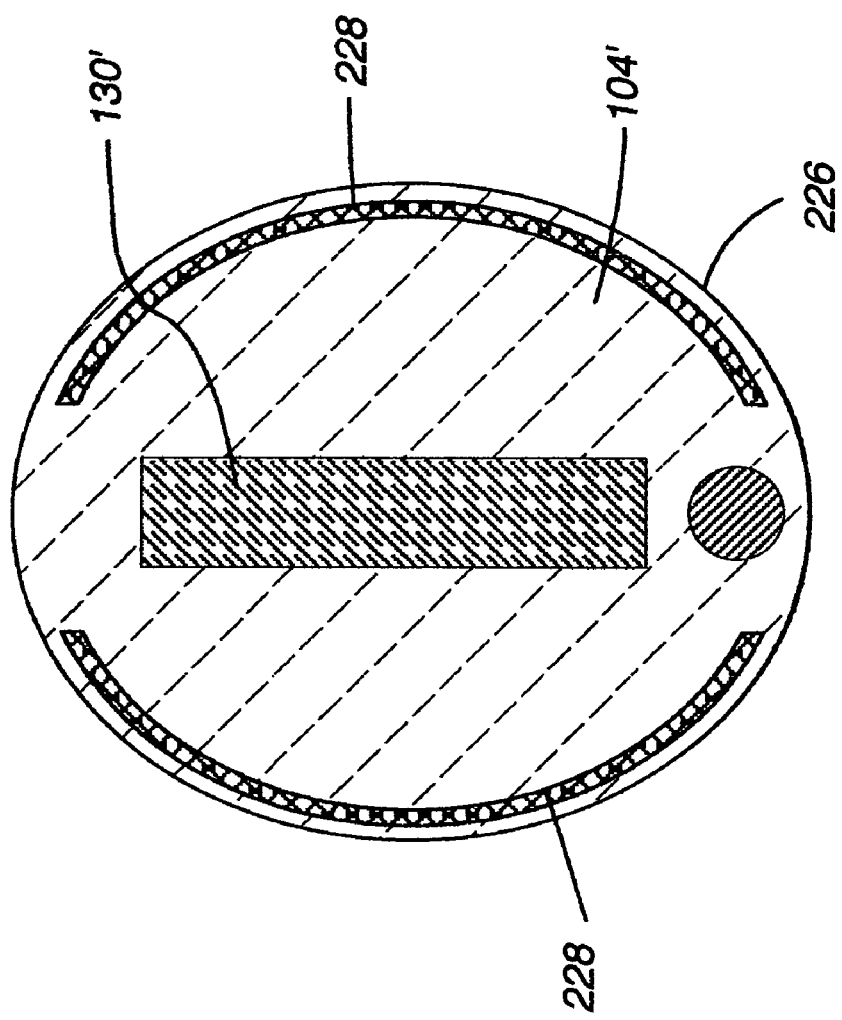
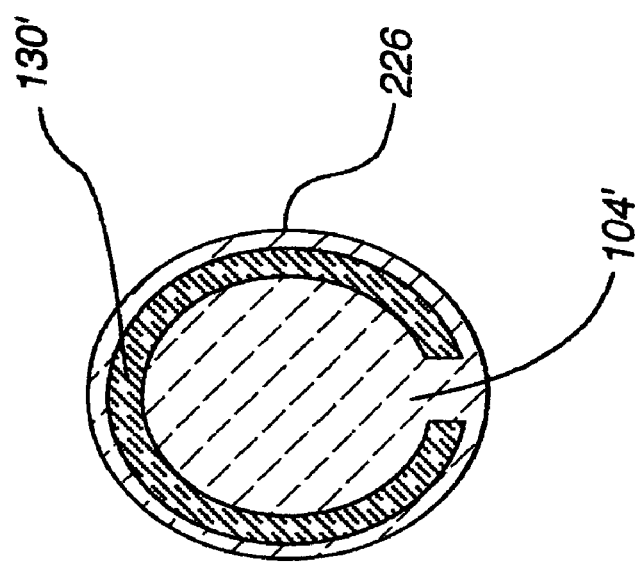

ILLUMINATED FISHING LURE

BACKGROUND OF THE INVENTION a. Field of the Invention

Aspects of the present invention relate generally to fishing equipment, and more particularly, to illuminated fishing lures.

b. Background Art

Salt water and fresh water fishing lures adapted to ensnare fish or other aquatic animals are known in the art. Many fishing lures are equipped with one or more hooks connected with a body and can be made from various types of material with various aspects to make the lure more visually attractive, such as different shapes and colors. Depending upon the depth of operation, intensity of sunlight, and/or water visibility conditions, the visually appealing aspects of a fishing lure can be diminished or completely lost.

BRIEF SUMMARY OF THE INVENTION

Aspects of the present invention relate to fishing lures equipped with one or more light sources that interact and/or interface with one or more light transmission mediums. The light transmission medium acts to illuminate one or more areas proximate to the fishing lure to provide a natural luminance or iridescence. The light transmission medium can be positioned proximate to the light source to increase the visibility of the illumination created by the light source. The light transmission medium can be located on an outer surface of or inside a body of the fishing lure. The light transmission medium can also be provided in the form of a soft flexible component made from Plastisol or other similar translucent materials. The light source can be embedded in or located proximate to the light transmission medium to amplify, intensify, and/or disperse light along the light transmission medium to provide a natural looking luminescence to the fishing lure.

In one aspect of the present invention, a fishing lure includes: a body; a light transmission medium connected with the body; a light source optically coupled with the light transmission medium; and a power source electrically coupled with the light source.

In another form of the present invention, a fishing lure includes: a body; a light transmission medium connected with the body; a light source optically coupled with the light transmission medium; a power source electrically coupled with the light source; a compartment formed in the body and having an opening adapted to receive the power source; and a removable cover adapted to connect with the compartment.

In yet another form of the present invention, a fishing lure includes: a body; a means for transmitting light connected with the body; a means for producing light optically coupled with the means for transmitting light; and a means for providing power coupled with the means for producing light.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 3 is a cross-sectional view of the fishing lure depicted in FIG. 2, taken along line 3-3.

FIG. 4 is a cross-sectional view of the fishing lure depicted in FIG. 3, taken along line 4-4.

FIG. 5 is a cross-sectional view of the fishing lure depicted in FIG. 3, taken along line 5-5.

FIG. 15 is a cross-sectional view of the fishing lure depicted in FIG. 13, taken along line 15-15.

FIG. 16 is a cross-sectional view of the fishing lure depicted in FIG. 15, taken along line 16-16.

FIG. 16A is a cross-sectional view of a fishing lure taken along line 16-16 of FIG. 15 with a light transmission medium fully surrounding an outer circumference of a lure body.

FIG. 16B is a cross-sectional view of a fishing lure taken along line 16-16 of FIG. 15 with a light transmission medium fully surrounding an outer circumference of a lure body and located beneath a protective coating.

FIG. 16C is a cross-sectional view of a fishing lure taken along line 16-16 of FIG. 15 with a light transmission medium embedded in the body of the lure and extending almost completely around an inner circumference below an outer surface of the body.

FIG. 16D is a cross-sectional view of a fishing lure taken along line 16-16 of FIG. 15 with holograms on opposing sides of a light transmission medium extending through the center of the fishing lure.

DETAILED DESCRIPTION OF THE INVENTION

Embodiments of the present invention relate to an illumination system for providing a natural luminance or iridescence to various embodiments of fishing lures operating under, on top of, or at different water levels. More particularly, aspects of the present invention relate to fishing lures equipped with one or more light sources that interact and/or interface with one or more light transmission mediums to illuminate one or more areas proximate to the fishing lure. Some embodiments include at least one light source interacting with and illuminating a light transmission medium, such as a polymer lens extruded from adhesive hot melt thermoplastics. In such an embodiment, the polymer lens can also contain florescent particles and/or be positioned to interact with florescent materials to provide an illuminated fishing lure with a natural luminescence appearance. The light transmission medium can be positioned proximate to the light source to increase the visibility of the illumination created by the light source. As such, the illumination system acts to mitigate the affects of changing sunlight and/or water visibility conditions.

As discussed in more detail below, the illumination system can include a light source optically coupled with a light transmission medium and can work with a variety of fishing lures, such as hard bodied, soft bodied, and jig style lure types. In some lures, the light transmission medium is made from a flexible translucent polymer lens, which can be located on an outer surface of a body of the fishing lure or inside the body of the fishing lure. In other lures, the light transmission medium is a soft flexible component made from Plastisol or other similar translucent materials. The light source can be embedded in or located proximate to the light transmission medium such that light from the light source is amplified, intensified, and dispersed along the light transmission medium to provide a natural looking luminescence to the fishing lure. A power source, such as a battery, can be used to power the light source. Embodiments of the fishing lure can also include a compartment adapted to house the power source and some or all of the associated circuitry for the light source. In some embodiments, the light source is activated and deactivated with a switch, while in other embodiments; the light source is activated and deactivated upon installation and removal of the power source into and out of the compartment. It is to be appreciated that the illumination system can be configured to operate with various types of lures and should not be construed to be limited to the lures depicted and described herein.

Figure 1:
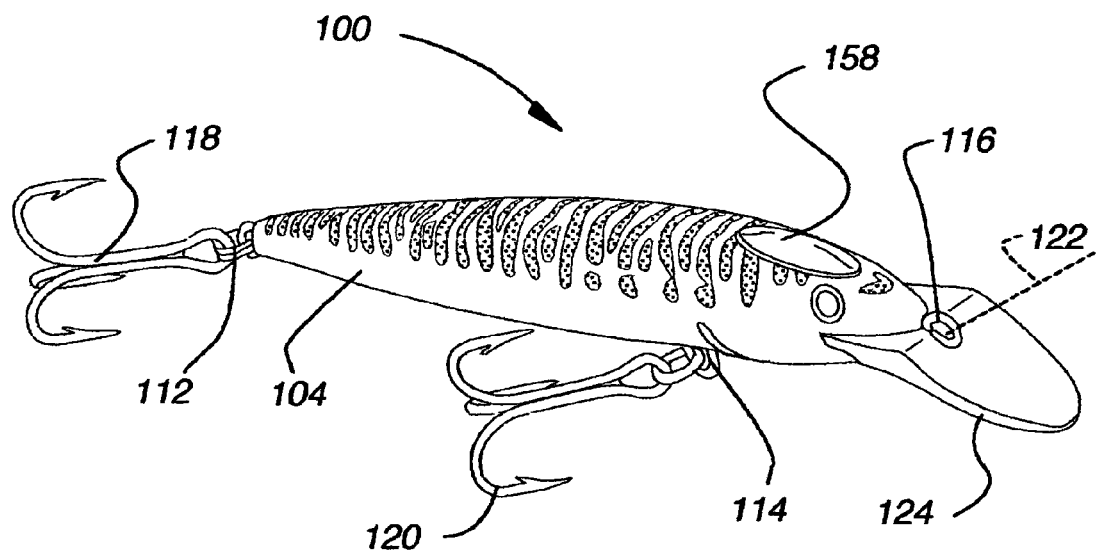
FIG. 1 is an isometric view of a first embodiment of a fishing lure including an illumination system according to aspects of the present invention.
Figure 2:
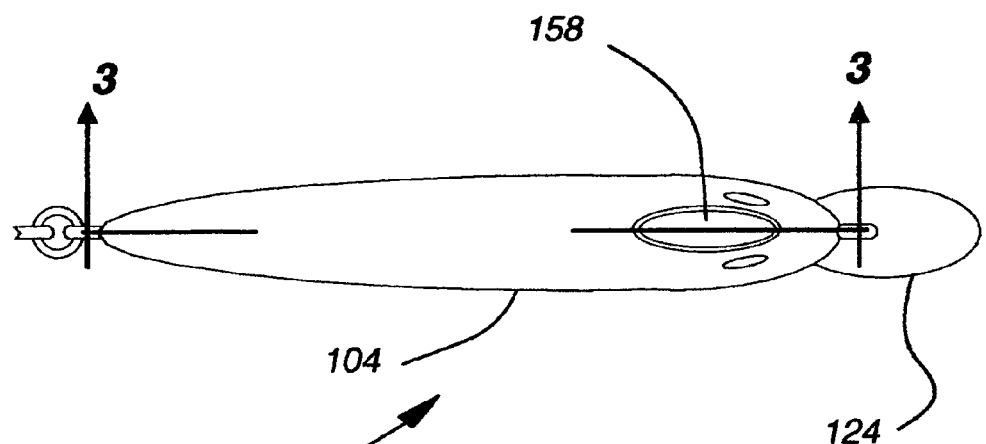
FIG. 2 is a top view of the fishing lure shown in FIG. 1.

FIGS. 1-9 shows one example of a fishing lure 100 including an illumination system 102 according to aspects of the present invention. As shown in FIG. 1, the fishing lure includes a body 104 in the form of a bait fish. The body 104 can be also be fabricated from various types of materials, such as plastic, ceramic, rubber, metal, wood, and/or composites thereof. As shown in FIG. 3, a wire member 106 extending through the lure body from a front end portion 108 to a rear end portion 110 defines first 112, second 114, and third eyelets or loops 116. As shown in FIG. 1, first and second treble hooks 118, 120 are connected with the first and second loops 112, 114, respectively. A fishing line 122 can be connected with the third loop 116. The fishing lure 100 can also include a fin or lip 124 extending from the front end portion 108 of the body 104 to effect lure dive depth and movement through the water. It is to be appreciated that the present invention can be used with fresh and salt water fishing lures having various other forms with various numbers and styles of hooks, and is not limited to the lure designs and shapes depicted and described herein.

Figure 10:
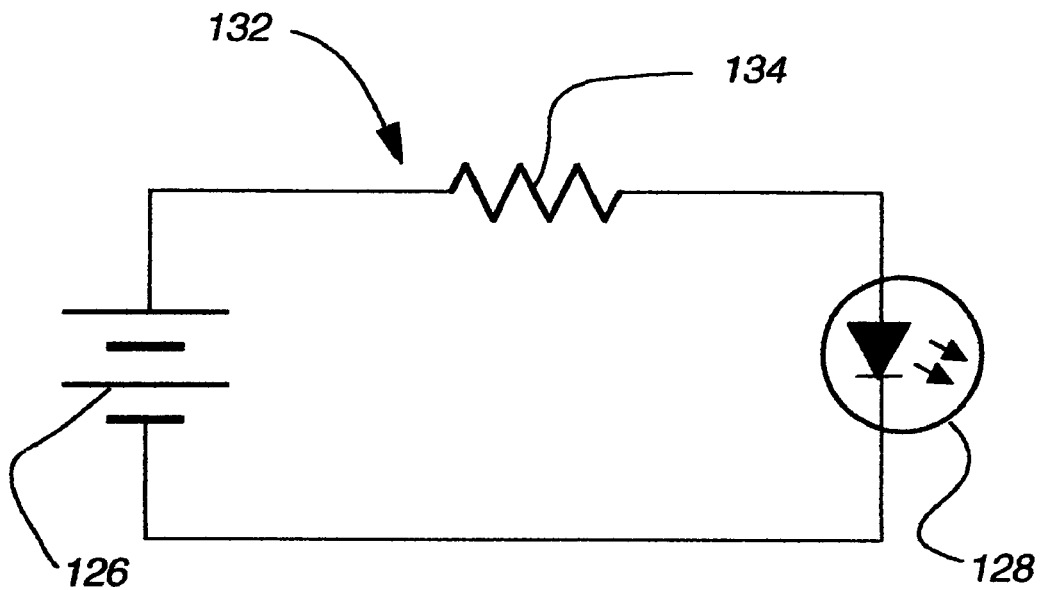
FIG. 10 is an electrical schematic diagram of a first circuit for an illumination system.
Figure 11:
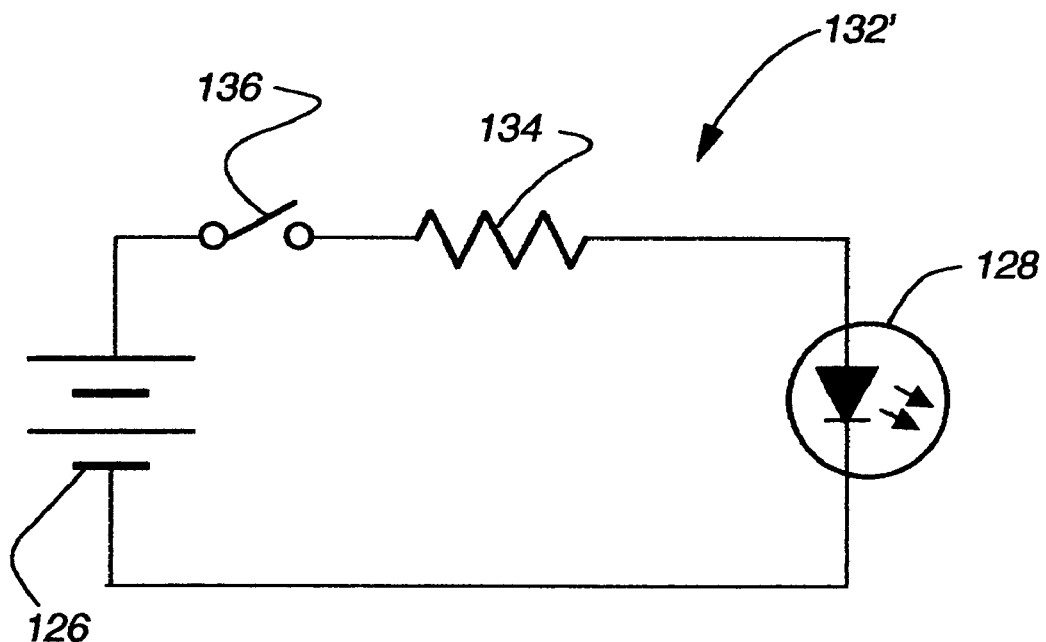
FIG. 11 is an electrical schematic diagram of a second circuit for an illumination system.

As previously mentioned, the illumination system 102 is utilized to provide a natural luminance or iridescence to the fishing lure 100. As shown in FIGS. 3-5, the illumination system 102 includes a power source 126 connected with a light source 128. The light source 128, in turn, is optically coupled with a light transmission medium 130. It is to be appreciated that the circuitry of the light source and power source can be configured in different ways, depending upon the type of power source and light source utilized in the illumination system. For example, FIG. 10 shows a circuit 132 including the power source 126 in the form of a battery and a light source 128 in the form of a LED. The circuit 132 also includes a current limiting resistor 134 in series between the battery 126 and the LED 128. The size, resistance and power rating of the current limiting resistor can be selected to provide a desired applied electrical current to the LED. In another circuit 132' shown in FIG. 11, a switch 136 is connected between the battery 126 and the LED 128. The switch allows a user to selectively power the LED on and off. It is to be appreciated that other components can be included in the illumination system circuit and should not be construed to be limited to that which is described and depicted herein. For example, other circuits may include a controller that provides a mode of operation wherein the light source automatically flashes on and off.

It is to be appreciated that various types and quantities of light sources and power sources can be used with the present invention, and should not be construed to be limited to those which are depicted and described herein. For example, the light source can be any one of a number of known sources, such as a light emitting diode ("LED"), an infrared emitting diode, a light bulb, or any suitable source of light. In other examples, red, blue or green LED's, or a combination thereof, may be used as the light source. For example, one circuit embodiment utilizes a single white LED as the light source, such as Agilent Model No. HLMP-KW50 T-1. In some embodiments, the power source is provided in the form of one or more batteries. For example, one circuit embodiment utilizes two 3 volt lithium batteries to power the light source, such as Eveready Energizer Model No. CR1616. As previously mentioned, the particular types of circuit components can be selected based on the desired battery life, illumination intensity, and other factors. For example, in a circuit embodiment having two 3 volt batteries, each having a capacity of 55 mAh, driving a single 4.6 volt white LED with a driven current of 20 mA would provide an estimated battery life of 5.5 hours.

Figure 9:
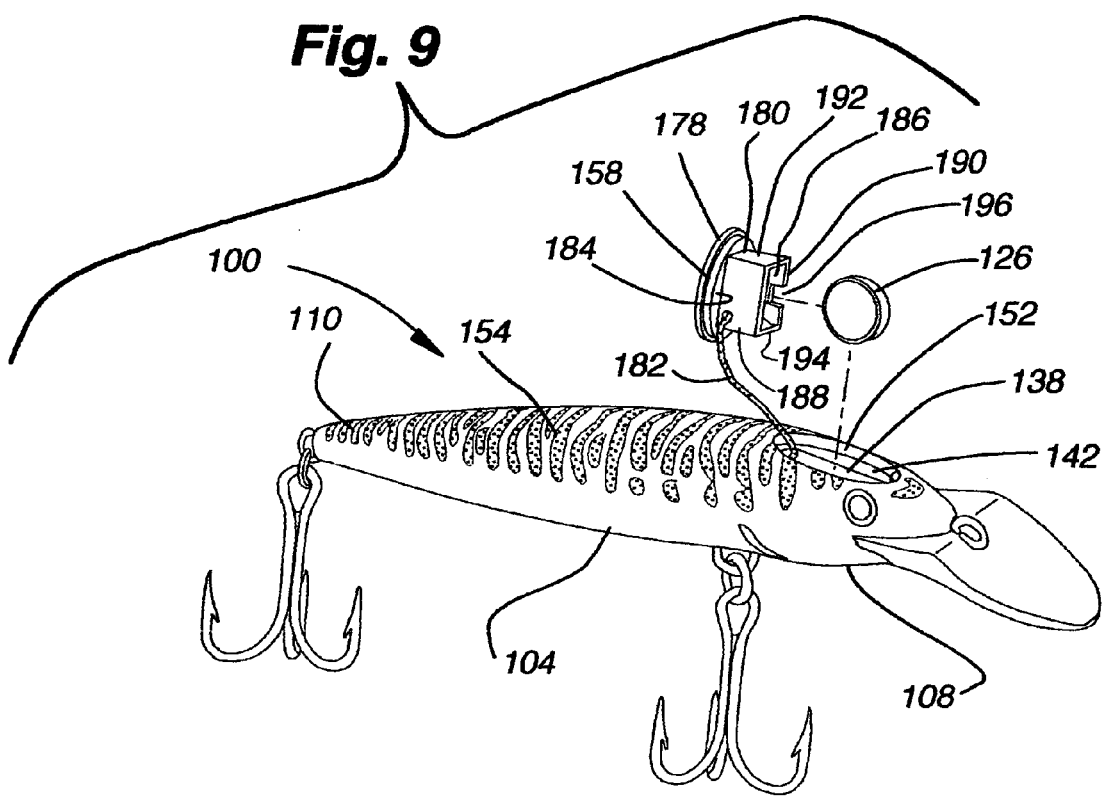
FIG. 9 is an isometric view of the fishing lure shown in FIG. 1 with a removable cover and power source removed from a body of the fishing lure.

Components of the illumination system 102 can be affixed to and/or housed within the fishing lure body 100 in a number of different ways. For example, the fishing lure 100 shown in FIGS. 1-5 and 9 includes a compartment 138 near the forward end portion 108 of the lure body 104 housing the power source 126, which is in the form of a battery. As shown in FIGS. 3, 5 and 9, the compartment 138 is defined by four sides extending upwardly from a closed bottom side 140 to an open top 142. More particularly, relatively wide right and left sides 144, 146 are connected with and are separated by relatively narrow front and rear sides 148, 150, defining a substantially rectangular-shaped cross section. A substantially elliptical-shape recessed area 152 extends downward from an upper surface 154 of the lure body 104 to an upper end portion of the compartment 138, defining a ledge 156 therebetween. As discussed in more detail below, a removable cover 158 is adapted to selectively connect with the recessed area 152, which can provide a water resistant seal to help prevent water from entering the compartment.

Figure 8:
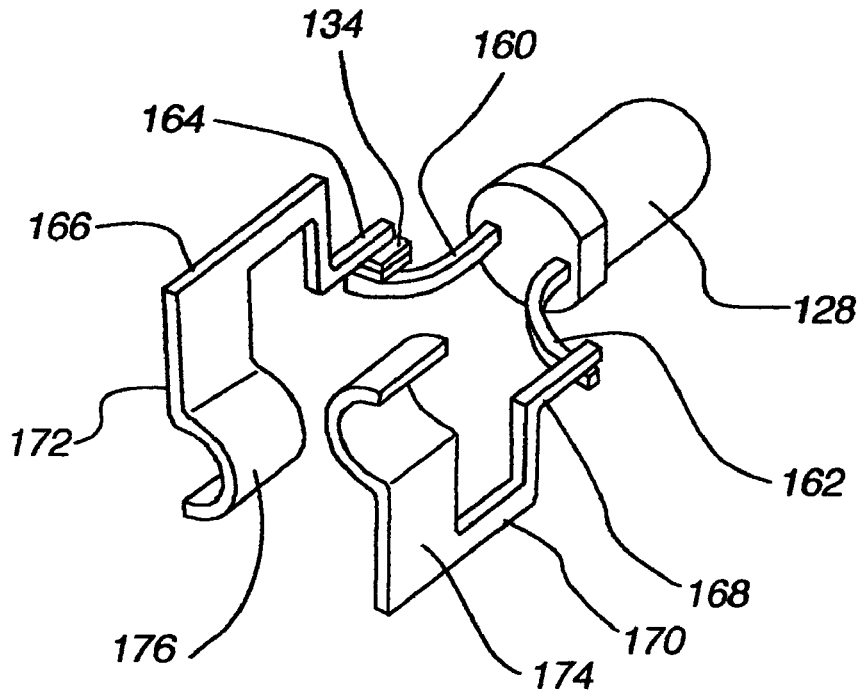
FIG. 8 is an isometric view of a light source adapted for use with the fishing lure shown in FIG. 1.

The illumination system circuit 102 provided in the fishing lure 100 shown in FIGS. 3, 5, and 8 is substantially represented by the circuit 132 shown in FIG. 10. As such, the light source 128 is activated upon installation of the battery 126 into the compartment 138. As shown in FIG. 3, the light source 128, which is in the form of a LED, is located in the body 104 of the fishing lure 100 adjacent the rear side 150 of the compartment 138. The LED 128 includes first and second leads 160, 162 extending in a forward direction toward the rear side 150 of the compartment 138. As shown in FIGS. 3, 5, and 8, the first lead 160 is connected with the resistor 134, which in turn, is connected with a first end portion 164 of a first battery contactor or clip 166. The second lead 162 is connected with a first end portion 168 of a second battery contactor or clip 170. From the first end portions 164, 168, the first and second battery clips 166, 170 extend forward through the rear side 150 of the compartment 138 to second end portions 172, 174 adapted to engage opposing sides of the battery 126. More particularly, the second end portions 172, 174 of the first and second battery clips 166, 170 include arcuate regions 176 extending inwardly toward each other in the compartment. The arcuate regions engage opposing sides of the battery when installed in the compartment and help maintain constant contact between the battery clips and battery.

As previously mentioned, the removable cover 158 can be placed on the lure body 104 to help prevent water from entering the compartment 138. FIGS. 3, 5, and 9 show one embodiment of the removable cover 158 adapted to connect with the lure body 104. As discussed in more detail below, the removable cover 158 is also adapted to help guide the placement of the battery 126 into the compartment 138. The removable cover 158 includes a lid portion 178 connected with an extended portion 180. The lid portion 178 is substantially elliptically-shaped and is adapted to be received within the elliptically-shaped recessed area 152 of the open top 142 of the compartment 138. As shown in FIGS. 1, 3, and 5, when the removable cover 158 is installed, the lid portion 178 is inserted into the elliptically-shaped recessed area 152 until the lid portion engages the ledge 156, which can provide a water resistant seal to help prevent water from entering the compartment. The fishing lure 100 can also include a tether 182 connecting the removable 158 cover with the lure body 104 to help prevent the removable cover from being dropped and/or lost when installing and removing the battery 126 from the compartment 138. For example, the fishing lure 100 shown in FIG. 9 includes a tether 182 in the form of a string connected with the extended portion 180 of the removable cover 158 and the rear wall 150 of the compartment 138. It is to be appreciated that the tether is not limited to the string shown in FIG. 9, and can have other forms, such as a chain, wire, rubber strap, or filament and can be connected with other component regions of the fishing lure.

As shown in FIGS. 3, 5, and 9, the extended portion 180 of the removable cover 158 is adapted to be received within the compartment 138 as well as help hold and guide the battery 126 during installation and removal. The extended portion 180 of the removable cover 158 is defined by four sides extending downwardly from a bottom surface 184 of the lid portion 178 to an open bottom 186. More particularly, relatively wide first and second sides 188, 190 are connected with and are separated by relatively narrow third and fourth sides 192, 194, defining a generally rectangular-shaped cross section. When the removable cover 158 is installed, the extended portion 180 is inserted into the compartment 138 such that the first and second sides 188, 190 are adjacent to the right and left sides 144, 146 of the compartment 138, respectively, and the third and fourth sides 192, 194 are adjacent to the front and rear sides 148, 150 of the compartment, respectively. As shown in FIG. 9, the second side 190 of the extended portion 180 includes a notch 196 adapted to prevent the second side from interfering with the contact between the curved portion of the second battery clip and the battery when the removable cover is installed. The extended portion can also be sized to provide a snug fit with the sides of the compartment to provide additional sealing to help prevent water from entering the compartment.

As previously mentioned, the extended portion 180 of the removable cover 158 is also adapted to hold the battery 126. As shown in FIG. 9, before installing the battery 126 in the compartment 138, the battery can be inserted into the extended portion 180 of the removable cover 158. The cross sectional area of the extended portion 180 can be configured to provide a relatively snug fit with the battery 126 to help hold the battery in the extended portion. As such, the snug fit can help prevent the battery from falling out of the extended portion and/or accidentally dropped during the installation process. The snug fit also allows the battery 126 to be removed from the compartment 138 along with the cover 158. Once the battery 126 is inserted into the extended portion 180, the cover 158 and battery 126 can be inserted into and engaged with the compartment 138 and lure body 104. Once the battery 126 is installed in the compartment 138, the battery will activate the LED 128 to illuminate the light transmission medium 130 of the fishing lure 100. The battery 126 can also be removed to deactivate the LED 128. As previously mentioned with reference to FIG. 11, the illumination circuit 132 can also include the switch 136 to activate and deactivate the light source 128. In such a configuration, the light source can be activated and deactivated while the battery is located inside the compartment.

As previously mentioned, the light source 128 on the fishing lure 100 is optically coupled with the light transmission medium 130. More particularly, the light source can be embedded in or located proximate to the light transmission medium in order to amplify, intensify, and/or disperse light along the light transmission medium to provide a natural looking luminescence to the fishing lure. The light transmission medium can be made from various materials, one of which is hot melt adhesive thermoplastic opaque pellets which can be extruded into a specific flexible translucent polymer lens, and can be located in various locations on the lure body.

Figure 6:
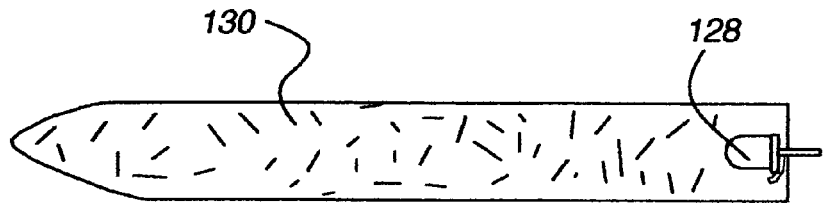
FIG. 6 is a side view of a light source optically coupled with a clear light transmission medium shown in FIG. 3.
Figure 7:
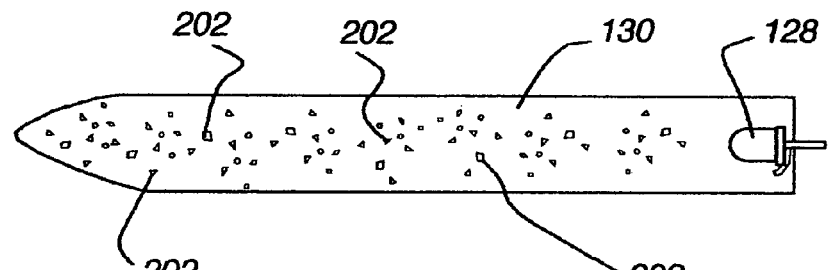
FIG. 7 is a side view of a light source optically coupled with a light transmission medium shown in FIG. 3 embedded with reflective materials.

A light transmission medium 130 in the form of a polymer lens configured to extend through the center of the lure body 104 is shown in FIGS. 3, 4, and 6. The polymer lens 130 defines a substantially rectangular cross section and extends from a forward end portion 198 adjacent the rear wall 150 of the compartment 138 to a rear end portion 200. The LED 128 is embedded into the forward end portion 198 of the polymer lens 130 as shown in FIGS. 3 and 6. As such, when the LED is activated, light emitted from the LED 128 is dispersed along the length of the polymer lens 130 and emanates outward through the lure body to provide a natural looking luminescence to the fishing lure. As previously mentioned, the light transmission medium 130 may also include opaque and/or reflective optical attributes such as reflective paint, milar, or holographic materials or other reflective components 202 that interact and/or interface with the light source, as shown in FIG. 7.

It is to be appreciated that the light transmission mediums described and depicted herein can be made from various light transmitting materials having any number of optical attributes for interacting and/or interfacing with the light source and/or transmitting or otherwise propagating light emitted by one or more light sources. In one example, the light transmitting materials may include translucent or opaque properties, such that the material allows light to pass therethrough. Depending on the specific illuminating attributes utilized in any given embodiment, the light transmitting materials can interact and/or interface with the light sources as well as with the ambient light in the water, if any, to create a particularized illumination inside and/or in close proximity to, the lure body. Further, certain light transmitting materials may include one or more additional optical attributes such as, but not limited to: (1) luminescence, whereby the light transmitting materials interact with the light sources to produce a light wavelength having a soft glow of a desired intensity and/or dispersion; (2) iridescence, whereby the light transmitting materials interact with and/or otherwise split light emitted by the light sources to produce a spectrum of light with more than one wavelength; for example, but not limited to, one having a rainbow-like refraction pattern; (3) fluorescence, whereby the light transmitting materials interact with the light sources to produce a light wavelength having a bright radiant glow; and (4) reflectivity, whereby the light transmitting materials reflect light at one or more wavelengths produced by the light sources without altering the wavelength of the light. It is to be appreciated that other optical properties may also be provided in the light transmitting materials. Such properties may operate upon, influence, distort or otherwise alter the phase, amplitude, wavelength and/or other properties of one or more beams of light.

Figure 12:
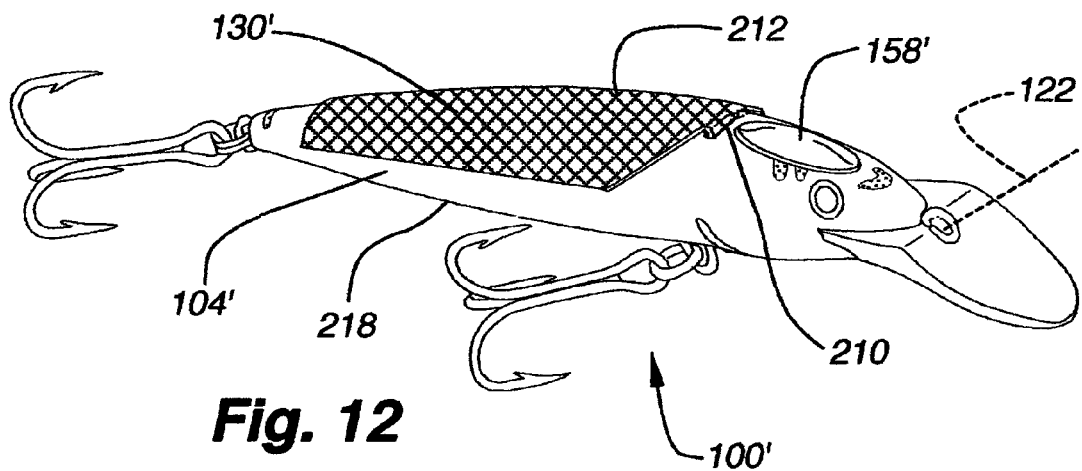
FIG. 12 is an isometric view of a second embodiment of a fishing lure including an illumination system according to aspects of the present invention.
Figure 13:
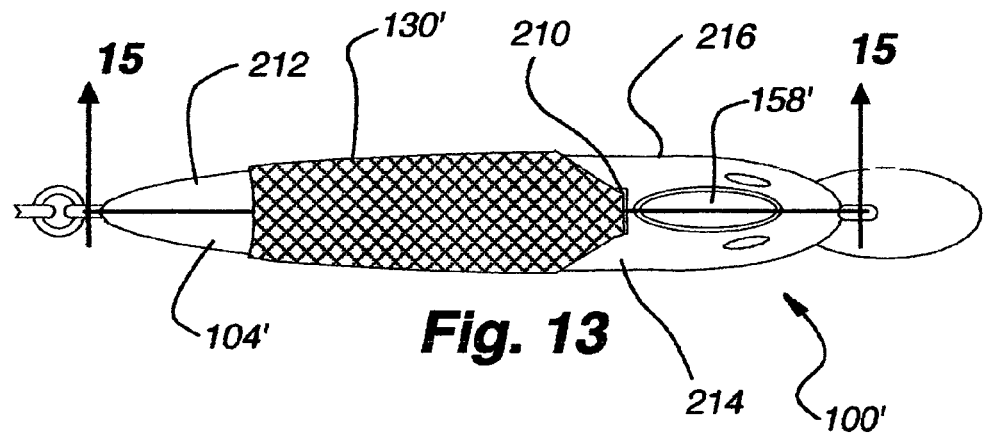
FIG. 13 is a top view of the fishing lure shown in FIG. 12.
Figure 14:
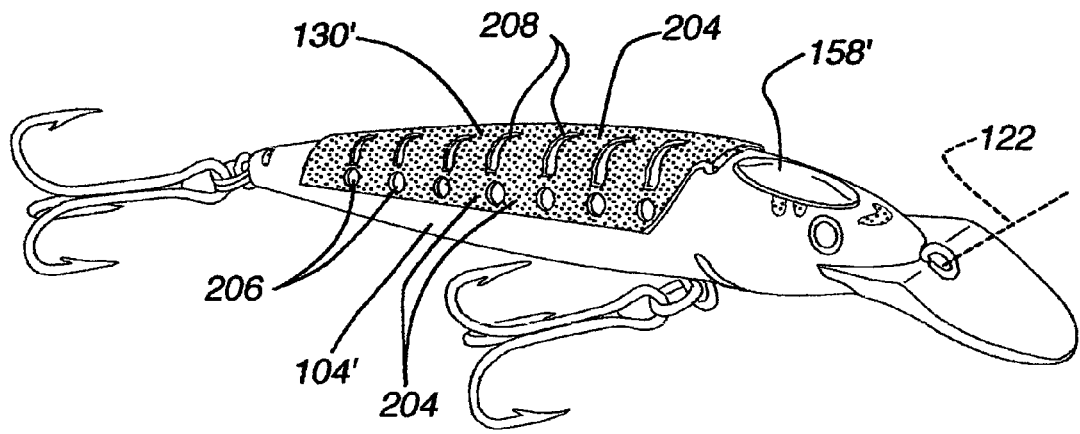
FIG. 14 is an isometric view of the fishing lure shown in FIG. 12 with an alternative form of a light transmission medium.

A second embodiment of a fishing lure 100' according aspects of the present invention is shown in FIGS. 12 and 13. The second embodiment of the fishing lure 100' includes a body 104' with a compartment 138', a removable cover 158', and an illumination system 102' that are substantially similar to those described above with reference to the first embodiment of the fishing lure 100. However, unlike the first embodiment 100 shown with the light transmission medium 130 placed inside the body 104, the second embodiment 100' of the fishing lure includes a light transmission medium 130' in the form of a polymer lens that extends along a portion of an outer surface of the lure body. Although the light transmission medium shown in FIGS. 12 and 13 includes a crossing pattern, it is to be appreciated that the light transmission medium is not limited to the pattern shown and need not include a pattern. For example, FIG. 14 shows the fishing lure from FIGS. 12 and 13 having the light transmission medium 130' having a plurality of reflective materials 204 embedded therein along with a pattern formed by a plurality of circular 206 and elongated cut-outs 208. In addition, the light transmission medium 130' shown in FIG. 14 can also be manufactured with perforated cut-outs that can be removed by the user to create custom patterns.

FIG. 15 is a cross-sectional view of the fishing lure 100' depicted in FIG. 13, taken along line 15-15 illustrating the connection of the light transmission medium 130' with the light source 128. As shown in FIG. 15, the light source 128, which is in the form of a LED, is embedded into a front end portion of the polymer lens. Both the LED and the polymer lens 130' extend rearward and upward from a rear wall 150' of the compartment 138'. From the LED, the polymer lens 130' extends upward and rearward through a slot 210 in the top 212 of the lure body 104'. From the slot, the polymer lens extends along the outer body surface to a rear end portion.

As shown in FIGS. 12, 13, and 16, the polymer lens 130' covers portions of the lure body 104' sides 214, 216 and does not extend to completely cover a bottom 218 of the lure body. It is to be appreciated that the light transmission medium 130' shown in FIGS. 12 and 16 can be configured with different shapes and can be placed in different locations with respect to the lure body. For example, FIG. 16A is a cross-sectional view of the fishing lure taken along line 16-16 of FIG. 15 with the light transmission medium 130' fully surrounding an outer circumference 220 of the lure body 104'. In another example shown FIG. 16B, the light transmission medium 130' is shown fully surrounding an outer circumference 220 of the lure body 104' and located beneath a protective coating 222, such as enamel. The light transmission medium 130' is also shown as surrounding a hologram 224 inside the body 104' of the fishing lure. In yet another example shown in FIG. 16C, the light transmission medium 130' is embedded in the body 104' of the lure and extends almost completely around an inner circumference below an outer surface 226 of the body 104'. In still another example shown in FIG. 16D, the light transmission medium 130' is shown as extending through the center of the body 104' of the fishing lure, similar to that described above with reference to the first embodiment. However, light emanating from the light transmission medium shown in FIG. 16D will engage reflective materials 228 located underneath the outer surface 226 of both sides of the lure body just under the surface.

Figure 18:
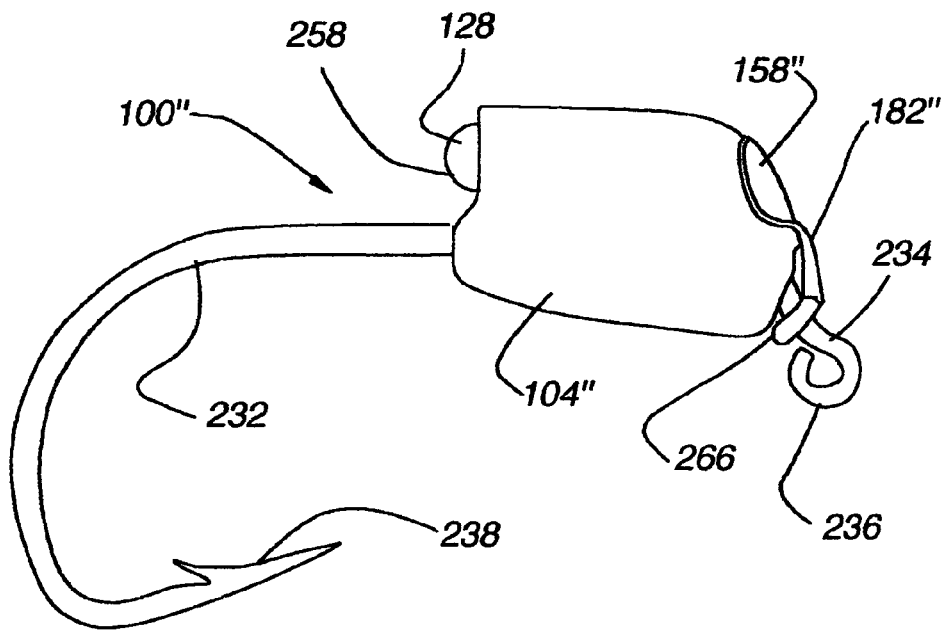
FIG. 18 is a side view of fishing lure shown in FIG. 17 with the soft flexible component removed.
Figure 17:
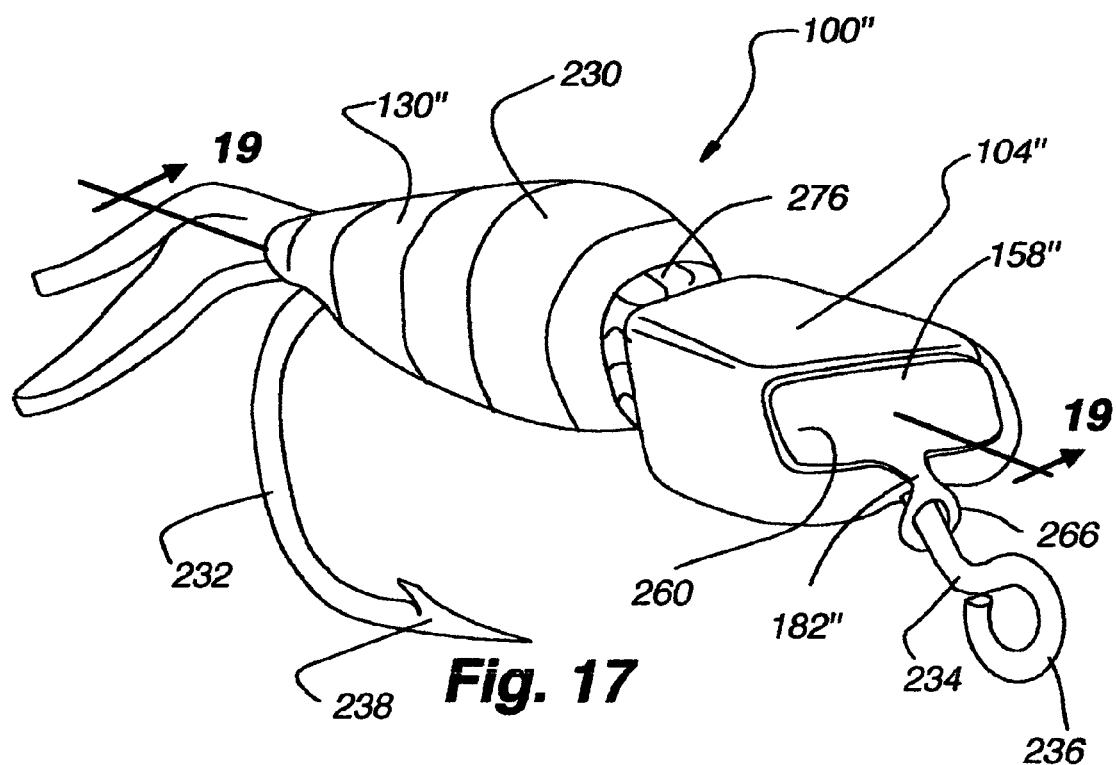
FIG. 17 is an isometric view of a third embodiment of a fishing lure including a soft flexible component in the form of a jig tail connected with a body in the form of a jig head and having an illumination system according to aspects of the present invention.
Figure 19:
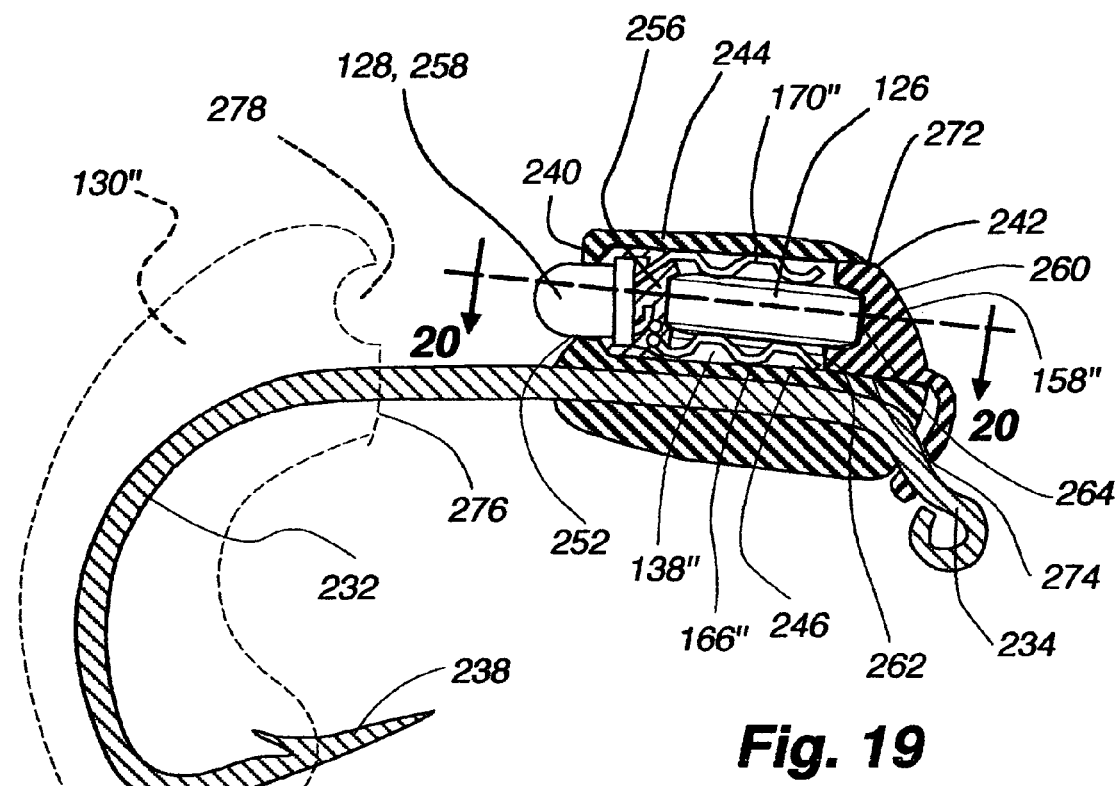
FIG. 19 is a cross-sectional view of the fishing lure depicted in FIG. 17, taken along line 19-19 and showing the jig tail partially removed from the body.

As mentioned above, some fishing lures according aspects of the present invention can include an illumination system having a light transmission medium in the form of a soft flexible component. The soft flexible component can be made from various materials, such as Plastisol or other similar translucent materials, and can be adapted to be selectively coupled with a light source. An embodiment of a fishing lure 100" including a soft flexible component 230 in the form of a jig tail is shown in FIGS. 17 and 18. The jig tail 230 is adapted to be selectively optically coupled with the light source 128 extending from a body 104" in the form of a jig head. As shown in FIGS. 17-19, the fishing lure 100" also includes a hook 238 having a first end portion 234 with an eyelet 236 formed therein and a barbed second end portion 238. The first end portion 234 of the hook 232 extends through and is connected with the body 104".

Figure 20:
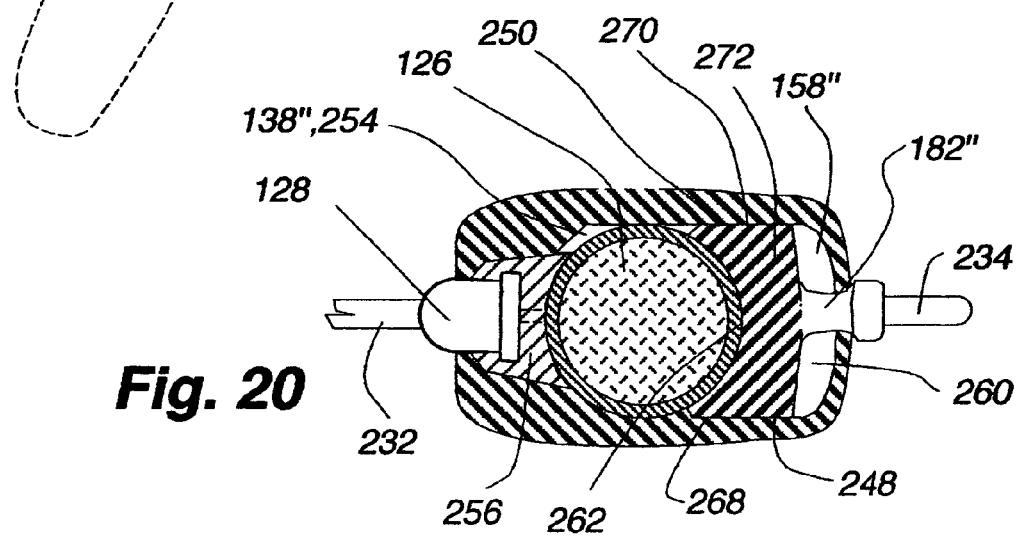
FIG. 20 is a cross-sectional view of the fishing lure depicted in FIG. 19, taken along line 20-20.
Figure 22:
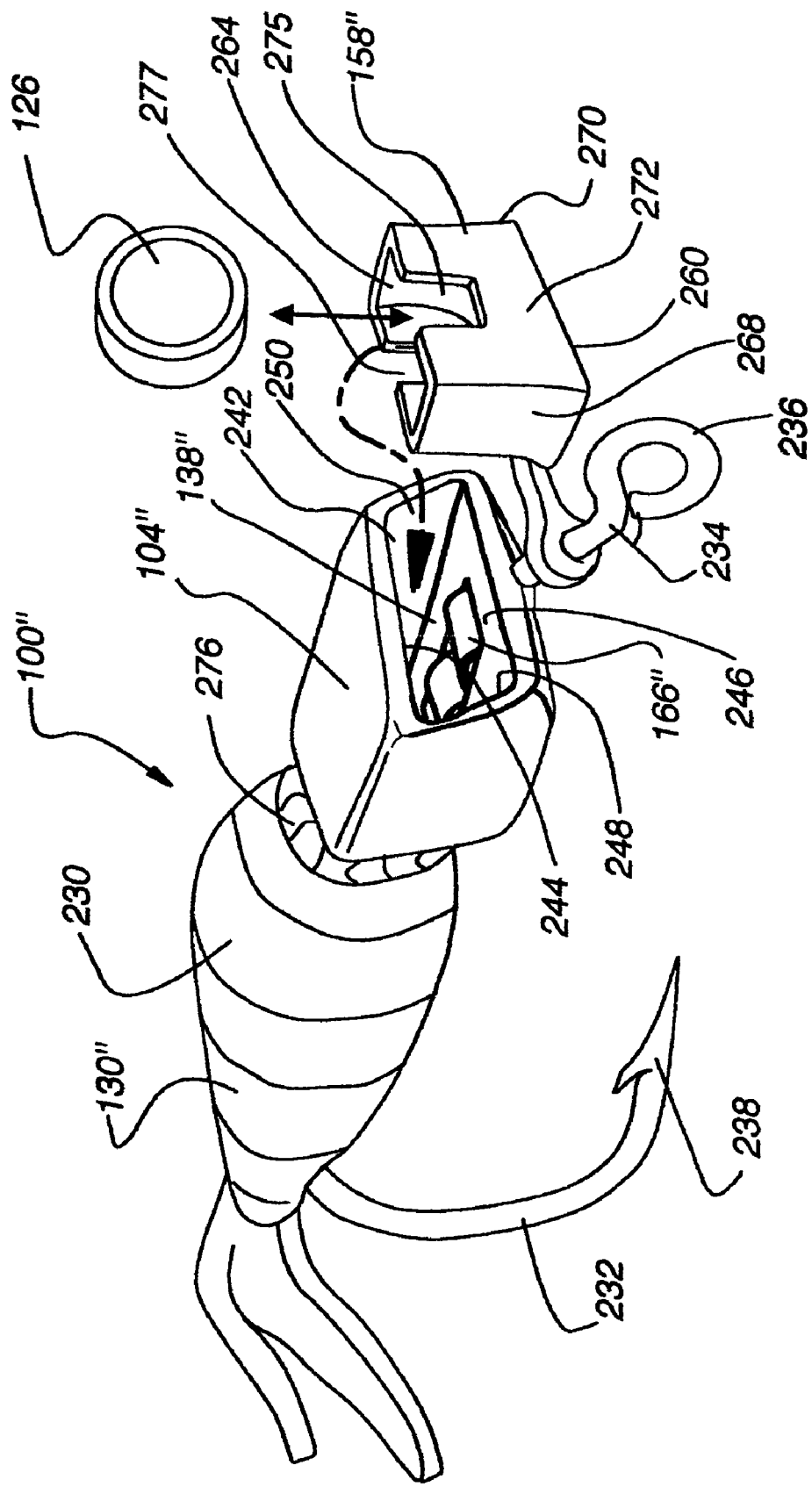
FIG. 22 is an isometric view of the fishing lure shown in FIG. 17 with a removable cover and power source removed from a body of the fishing lure.

A portion of the illumination system 102 is housed within the body or jig head 104" shown in FIGS. 17-20. More particularly, a compartment 138" inside the body 104" houses the power source 126, which is in the form of a battery, and a portion of the light source 128, which is in the form of a LED. It is to be appreciated that any number of light sources mentioned above with respect to other lure embodiments can be used with the fishing lure shown in FIGS. 17 and 18. As shown in FIGS. 19 and 22, the compartment 138" is defined by four sides extending forward from a rear side 240 to an open front 242. More particularly, relatively wide top and bottom sides 244, 246 are connected with and separated by relatively narrow right and left sides 248, 250. As discussed in more detail below with reference to FIG. 19, the LED 128 extends through an aperture 252 in the rear side 240 of the compartment 138". As shown in FIG. 20, rear end portions of the right and left sides 248, 250 taper inwardly toward each other to define a relatively narrow region 254 of the compartment 138". As discussed in more detail below, a sealing material 256 can be placed inside the relatively narrow region 254 of the compartment 138" adjacent a rear end portion of the LED 128. As such, the sealing material can be used to help hold the LED in position within the body as wells as help prevent water from entering into the compartment 138".

As previously mentioned, the illumination system 102 provides a natural luminance or iridescence to the jig tail 230. The illumination system circuit 132 provided in the fishing lure shown in FIGS. 17 and 18 is substantially represented by the circuit diagram shown in FIG. 10 and as described above. As such, the LED 128 is activated upon installation of the battery 126 into the compartment. As shown in FIGS. 19 and 20, the LED is located on the body 104" of the fishing lure 100" adjacent the rear side 240 of the compartment 138".

Figure 21:
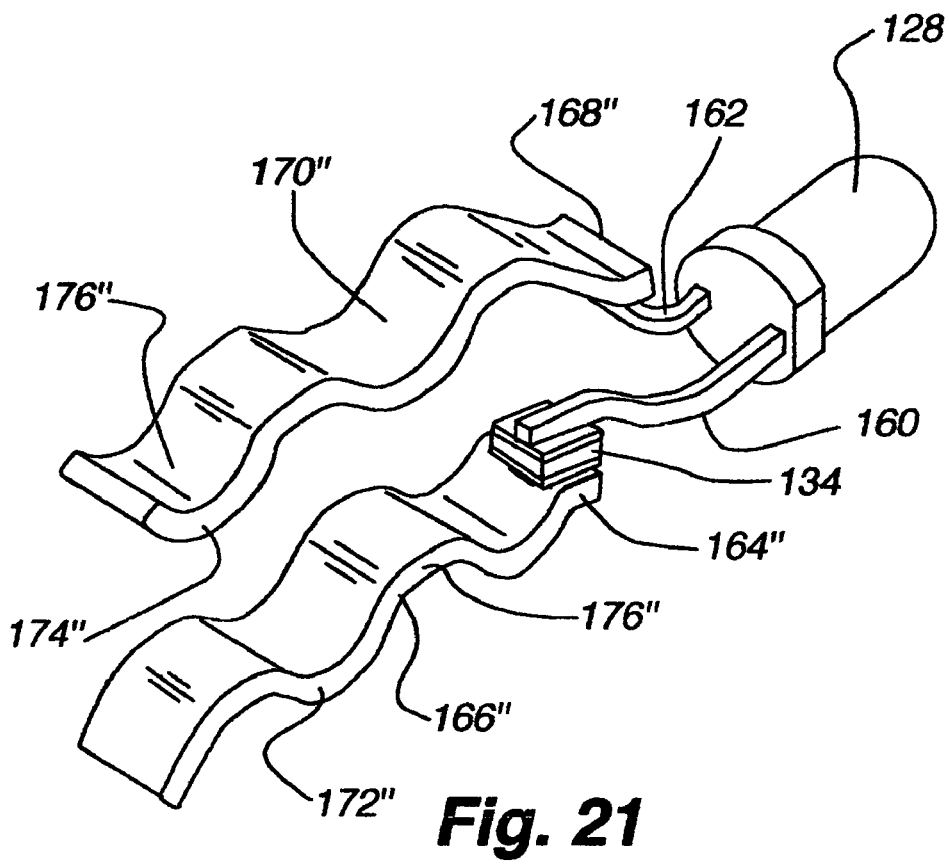
FIG. 21 is an isometric view of a light source adapted for use with the fishing lure shown in FIG. 17.

More particularly, a lens portion 258 of the LED extends through the aperture 252 in the rear side of the compartment. As shown in FIGS. 19 and 21, the LED 128 includes first and second leads 160, 162 extending in a forward direction toward the front of the compartment. The first lead 160 is connected with the resistor 134, which in turn, is connected with a first end portion 164" of a first battery contactor or clip 166". The second lead 162 is connected with a first end portion 168" of a second battery contactor or clip 170". As previously mentioned and as shown in FIG. 19, sealing material 256 surrounds a portion of the LED leads 160, 162 as well as first end portions 164", 168" of the battery clips 166", 170". From the sealing material 256, the first and second battery clips 166", 170" extend forward to second end portions 172", 174" adapted to engage opposing sides of the battery 126. More particularly, the second end portions of the first and second battery clips include one or more arcuate regions 176" that extend inwardly toward each other in the compartment 138". The arcuate regions 176" are adapted to engage opposing sides of the battery 126 when installed in the compartment and help maintain the battery clips in contact with battery.

As discussed above with other lure embodiments, the circuitry of the light source and power source can be configured in different ways, depending upon the type of power source and light source utilized in the illumination system. For example, the fishing lure 100" shown in FIGS. 19 and 20 can be configured with the light source and power source circuit 132' shown in FIG. 11. As described above with reference to other embodiments, other components can be included in the illumination system circuit and should not be construed to be limited to that which is described and depicted herein. For example, the circuit may include a controller that provides a mode of operation wherein the light source automatically flashes on and off.

The fishing lure shown in FIGS. 17, 18, and 22 also includes a removable cover 158" adapted to connect with the open front 242 of the compartment 138". As previously mentioned with other embodiments, the removable cover 158" can be placed on the lure body 104" to help prevent water from entering the compartment 138". As shown in FIGS. 19 and 22, the removable cover 158" includes a tapered outer side 260 and an inner side 262 with a groove 264. The removable cover also has a substantially rectangular-shaped cross section adapted to be received within the correspondingly shaped open front 242 of the compartment 138". When the removable cover 158" is installed, a portion of the battery 126 is received within the groove 264. As such, the battery 126 is held in position between the removable cover 158" and the sealing material 256 as well as between the battery clips 166", 170". The sealing material can also include a groove adapted to receive a portion of the battery. As shown in FIGS. 19 and 20, an outer perimeter of the removable cover 158" engages the top, bottom, right, and left sides 244, 246, 248, 250 of the compartment 138" to help prevent water from entering into the compartment. As discussed above with reference to other lure embodiments, a tether can be used to help prevent the removable cover from being lost or dropped. As shown in FIGS. 17 and 18, the fishing lure 100" includes a tether 182" extending from the tapered outer side 260 of the cover 158". The tether 182" includes a loop 266 connected with the first end portion 234 of the hook 232.

Referring to FIGS. 19 and 20, the outer perimeter of the removable cover is defined by four sides extending between the rear side 262 and the tapered outer side 260. More particularly, relatively narrow first and second sides 268, 270 are connected with and are separated by relatively wide third and fourth sides 272, 274, defining a generally rectangular-shaped cross section. When the removable cover 158" is installed, the first and second sides 268, 270 are adjacent to the right and left sides 248, 250 of the compartment 138", respectively, and the third and fourth sides 272, 274 are adjacent to the top and bottom sides 244, 246 of the compartment 138", respectively. The outer perimeter of the removable cover can also be sized to provide a snug fit with the sides of the compartment to provide a seal to help prevent water from entering the compartment. As shown in FIGS. 19 and 22, the third side 272 and the fourth side 274 can each include a notch 275, 277 adapted to prevent the third and fourth sides from interfering with the contact between the arcuate regions 176" of the first and second battery clips 166", 170" and the battery 126 when the removable cover 158" is installed.

The groove 264 in the rear side 262 of the removable cover 158" shown in FIGS. 19 and 22 can also be adapted to hold the battery 126 when the cover is removed, similar to the extended portion 180 of the removable cover 158 described above with reference to FIG. 9. As such, before installing the battery 126 in the compartment 138", the battery can be inserted into the groove 264 of the removable cover. The cross sectional area of groove can be configured to provide a relatively snug fit with the battery to help prevent the battery from easily falling out during the installation process. The snug fit can also allow the battery to be removed from the compartment along with the cover. Once the battery 126 is inserted into the groove 264, the cover 158" and battery 126 can be inserted into the compartment 138", which will activate the LED 128 to illuminate the jig tail 230. To deactivate the LED, the battery can be removed. As previously mentioned, the illumination system can also include a switch to activate and deactivate the light source. In such a configuration, the light source can be activated and deactivated while the battery is located inside the compartment.

As previously mentioned, the light transmission medium 130" of the fishing lure 100" shown in FIGS. 17-19 is the soft flexible component 230 in the form of the jig tail. The jig tail is adapted to be selectively optically coupled with the light source 128 extending from the body 104". The jig tail 230 can be coupled with the light source 128 by first inserting a portion of the hook 232 through this jig tail 230. The jig tail can then be positioned along the hook 232 to place a forward end portion 276 of the jig tail 230 adjacent to and in contact with the LED 128. As shown in FIG. 19, the jig tail 230 can also include a recess 278 in the front end portion 276 adapted to receive a portion of the LED lens 258. As such, the LED can be embedded into the jig tail. When the LED 128 is activated, light emitted from the LED is dispersed along the length of the jig tail and emanates outward through the jig tail to provide a natural looking luminescence to the fishing lure. As discussed above, the light transmission medium or jig tail may include opaque and/or reflective optical attributes such as reflective paint, milar, or holographic materials or other reflective components that interact and/or interface with the light source.

It will be appreciated from the above noted description of various arrangements and embodiments of the present invention that an illumination system for a fishing lure has been described which can include a power source, a light source, and a light transmission medium. The fishing lure can include a body and can be formed in various ways and operated in various manners. It is to be appreciated that other lure types, such as crank baits, poppers or plugs, may also be used in conjunction with the various embodiments of the present invention. It will also be appreciated that the features described in connection with each arrangement and embodiment of the invention are interchangeable to some degree so that many variations beyond those specifically described are possible. For example, the removable covers described herein can be adapted for use on any of the fishing lures described herein. In addition, it will be appreciated that the fishing lures according to aspects of the present invention need not include a removable cover.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A fishing lure comprising:
an elongate body defining a longitudinal direction, the body including a slot extending from an internal portion of the body to an outside surface of the body;
an elongate light transmission medium connected within said slot and extending externally along the body, wherein the length of the light transmission medium is in contact with and extends along the longitudinal direction of the body, the light transmission medium comprising at least one translucent polymer lens;
a light source comprising a light-emitting diode and a light-emitting diode lens, the light source being optically coupled with and embedded within an end of the light transmission medium residing in said slot so that light emitted from the light source is dispersed along the light transmission medium; and
a power source electrically coupled with the light source.

2. The fishing lure of claim 1, further comprising a compartment formed within the body, the compartment having an opening adapted to receive the power source, the light source being activated once the power source is inserted in the compartment.

3. The fishing lure of claim 1, further comprising a plurality of reflective materials embedded in the polymer lens.

4. The fishing lure of claim 1, wherein the at least one polymer lens is configured to at least one of amplify and intensify the light from the light source along the at least one polymer lens.

5. The fishing lure of claim 1, wherein the at least one polymer lens comprises a thermoplastic material.

6. The fishing lure of claim 1, wherein the at least one polymer lens comprises an extruded thermoplastic material.

7. The fishing lure of claim 1, wherein the at least one polymer lens comprises an adhesive thermoplastic material.

8. The fishing lure of claim 1, wherein the at least one polymer lens comprises a flexible material.

9. The fishing lure of claim 1, wherein the body comprises at least one reflective material configured to engage light emanating from the at least one polymer lens.

10. The fishing lure of claim 9, wherein the at least one reflective material is located under a surface of the body.

11. The fishing lure of claim 1, wherein the at least one polymer lens comprises an opaque optical attribute configured to at least one of interact and interface with light from the light source.

12. The fishing lure of claim 1, wherein the at least one polymer lens comprises a reflective opaque optical attribute configured to at least one of interact and interface with light from the light source.

13. The fishing lure of claim 1, wherein the at least one polymer lens comprises a holographic material configured to at least one of interact and interface with light from the light source.

14. The fishing lure of claim 1, wherein the at least one polymer lens comprises an optical attribute of luminescence.

15. The fishing lure of claim 1, wherein the at least one polymer lens comprises an optical attribute of iridescence.

16. The fishing lure of claim 1, wherein the at least one polymer lens comprises an optical attribute of fluorescence.

17. The fishing lure of claim 1, wherein the at least one polymer lens comprises an optical attribute of reflectivity.

18. The fishing lure of claim 1, wherein the at least one polymer lens comprises an optical attribute configured to alter at least one property of light from the light source.

19. The fishing lure of claim 18, wherein the optical attribute is configured to alter at least one of a phase, an amplitude and a wavelength of light from the light source.

20. The fishing lure of claim 1, wherein the at least one polymer lens comprises a pattern.

21. The fishing lure of claim 20, wherein the pattern comprises a crossing pattern.

22. The fishing lure of claim 20, wherein the pattern comprises a plurality of cut-outs.

23. The fishing lure of claim 22, wherein the plurality of cut-outs comprise circular and elongate cut-outs.

24. The fishing lure of claim 20, wherein the at least one polymer lens further comprises a plurality of embedded reflective materials.

25. The fishing lure of claim 1, wherein the at least one polymer lens comprises a plurality of perforated cut-outs configured to be selectively removed.

26. The fishing lure of claim 25, wherein the plurality of cut-outs comprise circular and elongate cut-outs.

27. The fishing lure of claim 1, wherein the body comprises at least one reflective material configured to engage light emanating from the at least one polymer lens.

28. The fishing lure of claim 27, wherein the at least one reflective material is located under a surface of the body.

29. The fishing lure of claim 1, further comprising a wire member extending through the body along the longitudinal direction of the body, wherein the wire member defines at least one loop external to the body.

* * * * *